(12) United States Patent
Panday et al.

(10) Patent No.: US 12,434,770 B1
(45) Date of Patent: Oct. 7, 2025

(54) VEHICLE FRAME HAVING ASYMMETRIC BEAD STRUCTURE FOR HIGH VOLTAGE COMPONENT PROTECTION

(71) Applicant: FCA US LLC, Auburn Hills, MI (US)

(72) Inventors: Kedar V Panday, Auburn Hills, MI (US); Santosh Pethe, Auburn Hills, MI (US); Krishnamurthy Hegde, Auburn Hills, MI (US); Eric J Stahmer, Auburn Hills, MI (US); Scott McGuire, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/971,987

(22) Filed: Dec. 6, 2024

(51) Int. Cl.
*B62D 21/15* (2006.01)

(52) U.S. Cl.
CPC .................................. *B62D 21/152* (2013.01)

(58) Field of Classification Search
CPC ......... B62D 21/152; B62D 21/00; B60K 1/00
See application file for complete search history.

(56) References Cited

U.S. PATENT DOCUMENTS

| | | | |
|---|---|---|---|
| 7,097,235 B2 * | 8/2006 | Yasukouchi | B62D 21/152 296/187.03 |
| 8,936,276 B1 * | 1/2015 | Vyas | B62D 25/082 180/274 |

* cited by examiner

*Primary Examiner* — Jason D Shanske
*Assistant Examiner* — Matthew James O'Neill
(74) *Attorney, Agent, or Firm* — Jeremy J. Klobucar

(57) ABSTRACT

A vehicle including a frame that includes a first longitudinally extending rail and a second longitudinally extending rail, wherein one of the first longitudinally extending rail and the second longitudinally extending rail includes a component mounted thereto. The first and second longitudinally extending rails each include a bead pattern that limits deformation of the respective rail during a frontal impact to the vehicle, and the bead pattern of the one of the first longitudinally extending rail and the second longitudinally extending that includes the component mounted thereto is different from the bead pattern of the other of the first longitudinally extending rail and the second longitudinally extending rail that does not have the component mounted thereto to limit an amount of deformation thereof during the frontal impact to the vehicle to minimize movement of the component in a direction toward a high-voltage component attached to the one rail.

14 Claims, 8 Drawing Sheets

VEHICLE FRAME HAVING ASYMMETRIC BEAD STRUCTURE FOR HIGH VOLTAGE COMPONENT PROTECTION

FIELD

The present disclosure relates to a vehicle frame having an asymmetric bead structure for high voltage component protection.

BACKGROUND

This section provides background information related to the present disclosure which is not necessarily prior art.

Vehicles with battery-powered electric drivetrains are becoming increasingly more common, and are undergoing substantial research and development. One challenge being faced during the development of battery-powered electric vehicles (BEV) is that the battery is typically packaged under a floor of the vehicle due to its large size, and electric drive motor critical high-voltage components responsible for operation of the vehicle are typically packaged under a hood of the vehicle, which exposes the high-voltage components to a danger of being damaged in the event that the vehicle experiences a frontal collision. This is undesirable from the standpoint that any damage to a high-voltage component can cause a short in the electric system that can result in loss of high-voltage isolation and prevent shutdown of the battery. Accordingly, it is important that the integrity of the high-voltage components be maintained.

Past attempts to protect the integrity of the high-voltage components included packaging the high-voltage components at locations of the vehicle that provided protection to the high-voltage components, or increasing the complexity of the front-end structure of the vehicle. Oftentimes, however, these locations were difficult to access and made it difficult to service the high-voltage components. Moreover, these hard-to-reach locations increased the complexity of routing high-voltage cables that connected the high-voltage components with the battery pack and other electronic features of the vehicle, and repackaging these components in hard-to-reach locations can lead to increased dimensions of the vehicle or potentially require altering the appearance of the vehicle.

SUMMARY

This section provides a general summary of the disclosure, and is not a comprehensive disclosure of its full scope or all of its features.

According to a first aspect of the present disclosure, there is provided a vehicle that may include a frame supporting an electric drive motor; and a high-voltage component attached to a forward end and upper surface of the electric drive motor, wherein the frame includes a first longitudinally extending rail and a second longitudinally extending rail, one of the first longitudinally extending rail and the second longitudinally extending rail includes a component mounted thereto; the first and second longitudinally extending rails each include a bead pattern that limits deformation of the respective rail during a frontal impact to the vehicle; and the bead pattern of the one of the first longitudinally extending rail and the second longitudinally extending that includes the component mounted thereto is different from the bead pattern of the other of the first longitudinally extending rail and the second longitudinally extending rail that does not have the component mounted thereto to limit an amount of deformation thereof during the frontal impact to the vehicle to minimize movement of the component in a direction toward the high-voltage component.

According to the first aspect, each of the bead patterns includes a longitudinally extending bead, a plurality of vertically upwards extending beads connected to the longitudinally extending bead, and a plurality of vertically downwards extending beads connected to the longitudinally extending bead.

According to the first aspect, the longitudinally extending bead, each of the vertically upwards extending beads, and each of the vertically downwards extending beads are in the form of a recess.

According to the first aspect, the different bead pattern includes an additional vertically upwards extending bead connected to the longitudinally extending bead.

According to the first aspect, the component is a pump assembly.

According to the first aspect, the vehicle may further include a protection shield attached to electric drive motor, and configured to shield the high-voltage component from the component during the frontal impact.

According to the first aspect, the bead patterns are provided on a side surface of the first and second longitudinally extending rails that face the electric drive motor.

According to a second aspect of the present disclosure, there is provided a vehicle that may include a frame including a first longitudinally extending rail and a second longitudinally extending rail; an electric drive motor positioned between and supported by each of the first and second longitudinally extending rails; a pump assembly attached to the first longitudinally rail at a location positioned forward of the electric drive motor; and a high-voltage component attached to a forward end and upper surface of the electric drive motor, wherein the first longitudinally extending rail include a first bead pattern that limits deformation thereof during a frontal impact to the vehicle; the second longitudinally extending rail include a second bead pattern that limits deformation thereof during a frontal impact to the vehicle; and the first bead pattern is different from the second bead pattern to limit deformation of the first longitudinally extending rail during the frontal impact to a greater extent than the second bead pattern limits deformation of the second longitudinally extending rail during the frontal impact to minimize movement of the component in a direction toward the high-voltage component.

According to the second aspect, each of the first and second bead patterns include a longitudinally extending bead, a plurality of vertically upwards extending beads connected to the longitudinally extending bead, and a plurality of vertically downwards extending beads connected to the longitudinally extending bead.

According to the second aspect, the longitudinally extending bead, each of the vertically upwards extending beads, and each of the vertically downwards extending beads are in the form of a recess.

According to the second aspect, the first bead pattern includes an additional vertically upwards extending bead connected to the longitudinally extending bead.

According to the second aspect, the first and second bead patterns are provided on a side surface of the first and second longitudinally extending rails that face the electric drive motor.

According to the second aspect, the vehicle may further include a protection shield attached to electric drive motor, and configured to shield the high-voltage component from the component during the frontal impact.

According to the second aspect, the protection shield is attached to a forward end of the electric drive motor at a position forward and spaced apart from the high-voltage component, and between the high-voltage component and the pump assembly, and the protection shield is configured to shield and deflect the pump assembly from contacting the high-voltage component when the pump assembly is forced in a direction toward the high-voltage component during the frontal impact.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
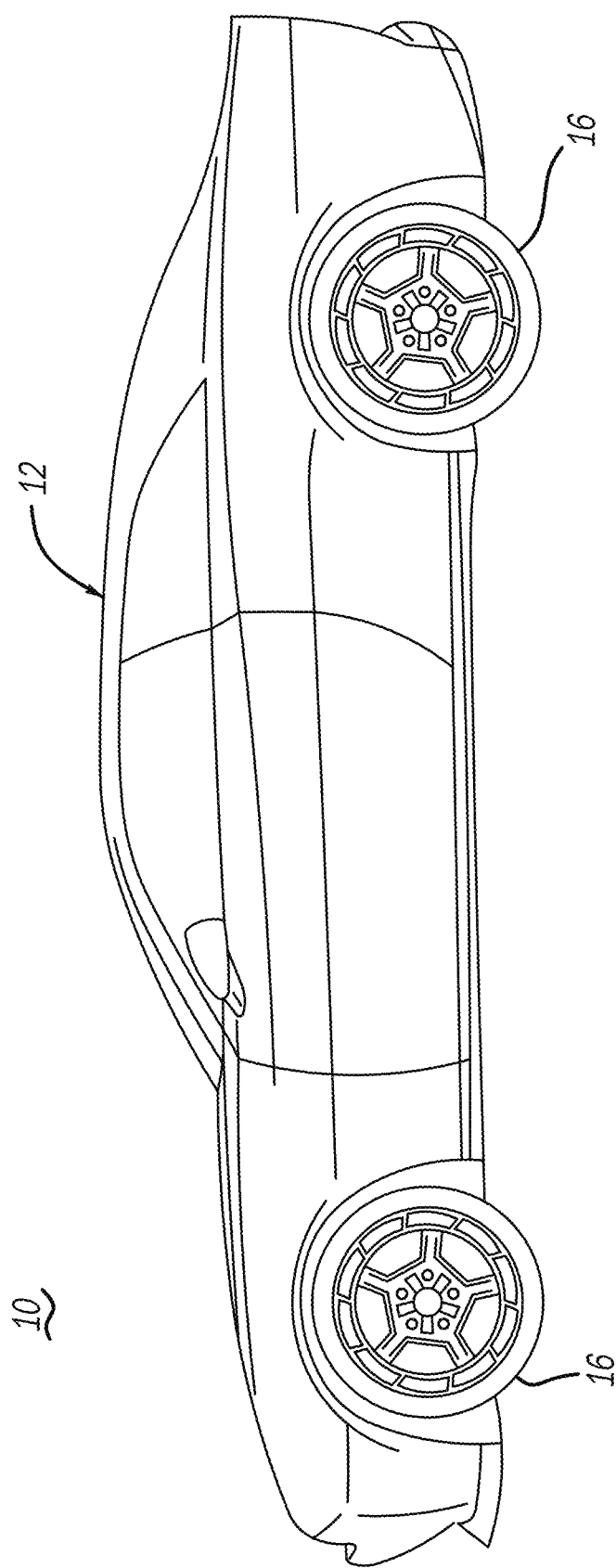
FIG. 1 is a side-perspective view of an example vehicle according to a principle of the present disclosure.

FIG. 1 illustrates an example vehicle 10 according to a principle of the present disclosure. Vehicle 10 includes a body 12 attached to a vehicle frame 14 (FIG. 2), and a plurality of wheels 16.

Figure 2:
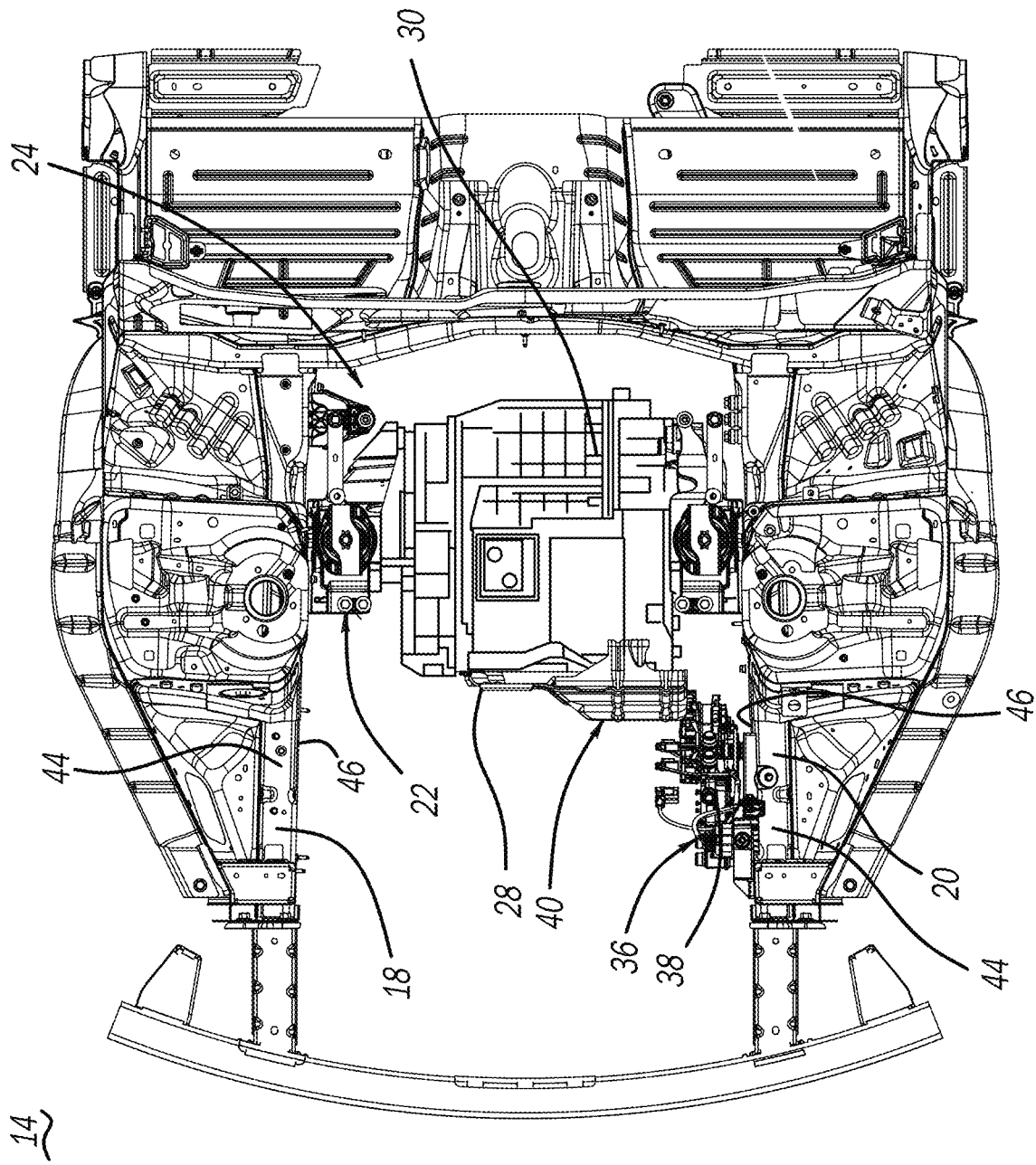
FIG. 2 is an overhead perspective view of a portion of a frame supporting a propulsion system of the vehicle illustrated in FIG. 1.

Now referring to FIG. 2, it can be seen that vehicle frame 14 includes first and second longitudinally extending rails 18, 20 that support a propulsion system 22 of vehicle 10. Rail 18 can be considered a first or right rail and rail 20 can be considered a second or left rail. In the illustrated embodiment, propulsion system 22 is an electric drive module 24 that is positioned between and supported by first and second rails 18, 20. It should be understood, however, that propulsion system 22 may include an internal combustion engine (not shown) without departing from the scope of the present disclosure.

Figure 3:
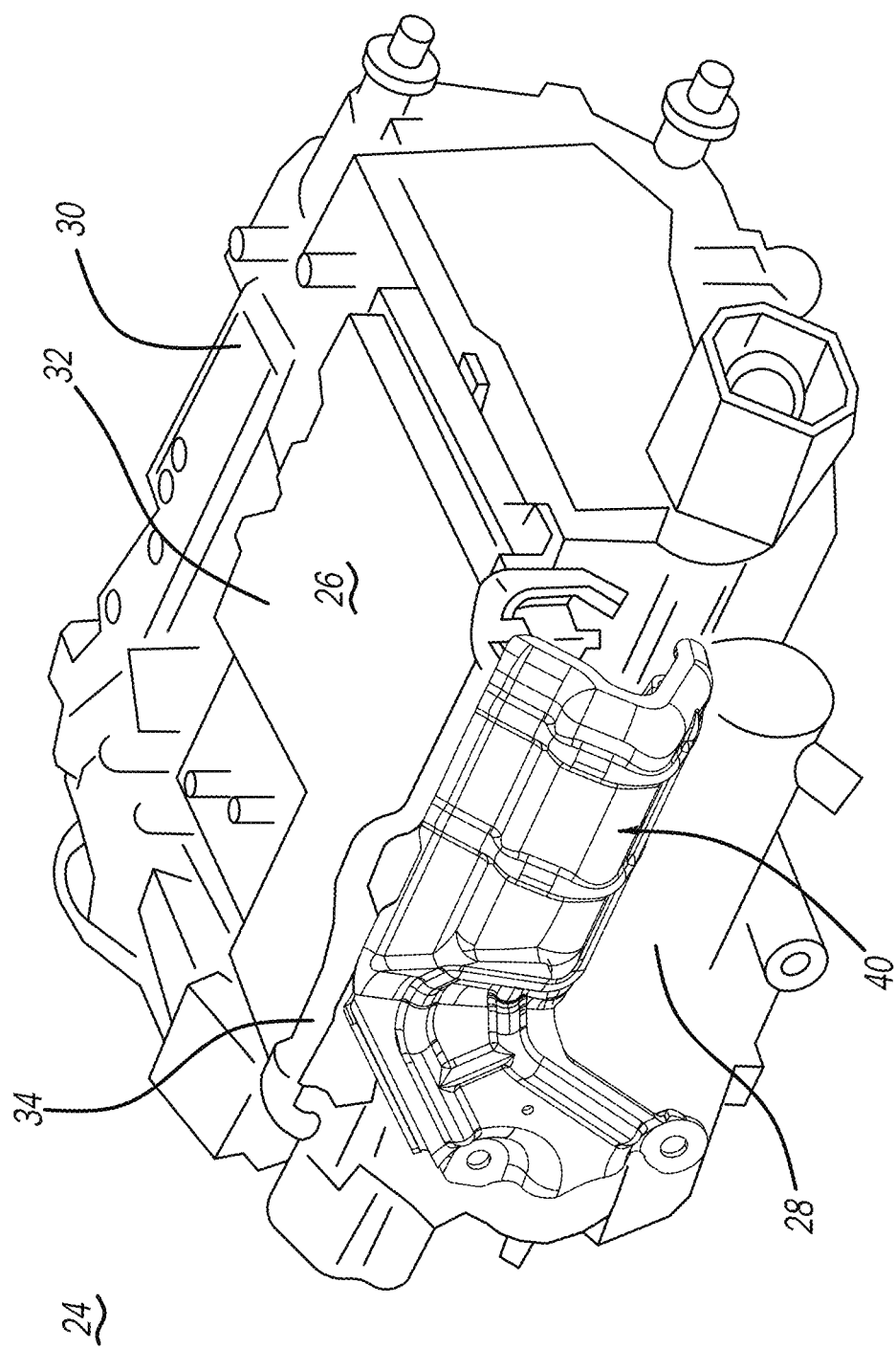
FIG. 3 is an isometric perspective view of the propulsion system illustrated in FIG. 2 having a high-voltage component and high-voltage component protection shield attached thereto.

As best shown in FIG. 3, electric drive motor 24 includes a high-voltage component 26 attached to a forward end 28 on an upper surface 30 of electric drive motor 24. High-voltage component 26 may be, for example, a power inverter device that is configured to convert high-voltage direct current (DC) stored in a battery pack (not shown) of vehicle 10 to a high-voltage three-phase alternating current (AC) that can be used to drive the electric drive motor 24. It should be understood, however, that other high-voltage components 26 are contemplated including but not limited to a power distribution center (PDC), an integrated dual charging module (IDCM), an electric air conditioning (EAC) module, and a park distance control (PDC) module without departing from the scope of the present disclosure.

High-voltage component 26 includes a housing 32 that may be formed of a rigid metal material such as cast aluminum, or may be formed of a polymeric material such as polyamide (e.g., NYLON®) or some other material, and which houses a plurality of high-voltage electrical features (not shown) such as electrical circuits and the like. Inasmuch as high-voltage component 26 is located at forward end 28 of electric drive motor 24 due to packaging restraints of vehicle 10, however, high-voltage component 26 may be at risk to be damaged if vehicle 10 is subjected to a collision event with, for example, another vehicle or another object. That is, if high-voltage component 26 is subjected to contact with another component of vehicle 10 during a collision event, housing 32 may crack and expose the high-voltage electrical features, which is undesirable.

Moreover, if cracks or sharp edges develop in housing 32 as a result of the collision event, the sharp edges may contact other high-voltage features of electric drive motor 24 such as high-voltage cables 34 that are positioned near high-voltage component 26, which can cut or sever the cables 34. This is undesirable from the standpoint that any damage to a high-voltage component 26 or cables 34 can cause a short in the electric system that can result in loss of high-voltage isolation and prevent shutdown of the battery (not shown).

For example, again referring to FIG. 2, it can be seen that first and second rails 18 and 20 can be used to support other features of vehicle 10 including, but not limited to, a pump assembly 36 having a rigid (e.g., metal) shell 38 that includes various pumps (not shown) and sensors (not shown). As shown in FIG. 2, because pump assembly 36 is located forward of electric drive motor 24, it is possible for pump assembly 36 to be forced in a rearward direction (i.e., back toward electric drive motor 24) if vehicle 10 is subjected to a frontal collision with another vehicle or an object. If pump assembly 36 is forced back with enough force that pump assembly 36 contacts high-voltage component 26, the contact between pump assembly 36 and high-voltage component 26 may, as noted above, cause housing 32 of high-voltage component 26 to crack, which is undesirable. Accordingly, as shown in FIGS. 2 and 3, vehicle 10 may be provided with a protection shield 40 attached to electric drive motor 24 that can provide protection for high-voltage component 26 from contact by pump assembly 36 or another component of vehicle 10 located proximate to high-voltage component 26.

While it may be desirable for vehicle 10 to include protection shield 40 to provide protection for high-voltage component 26, it is also desirable to design first and second rails 18 and 20 to deform in a collision event in a manner that further protection is provided to electric drive module 24 and high-voltage component 26. This may be accomplished, with reference to FIGS. 4 and 5, by providing the first and second rails 18, 20 with a bead arrangement 42a and 42b, respectively, that increases the structural rigidity of the first and second rails 18 and 20, while also influencing the deformation characteristics of the first and second rails 18 and 20.

In this regard, depending on which of the first and second rails 18, 20 supports pump assembly 36, the deformation characteristics of the selected rail 18 or 20 can be different from the other rail 18 or 20 that does not support the pump assembly 36. Put another way, the bead pattern 42a or 42b of the rail 18 or 20 that supports the pump assembly 36 can be modified such that the rail 18 or 20 including the pump assembly 36 deforms to a lesser extent in comparison to the other rail 18 or 20, which can assist in preventing contact between pump assembly 36 and high-voltage component 26 during a collision event.

Figure 4:
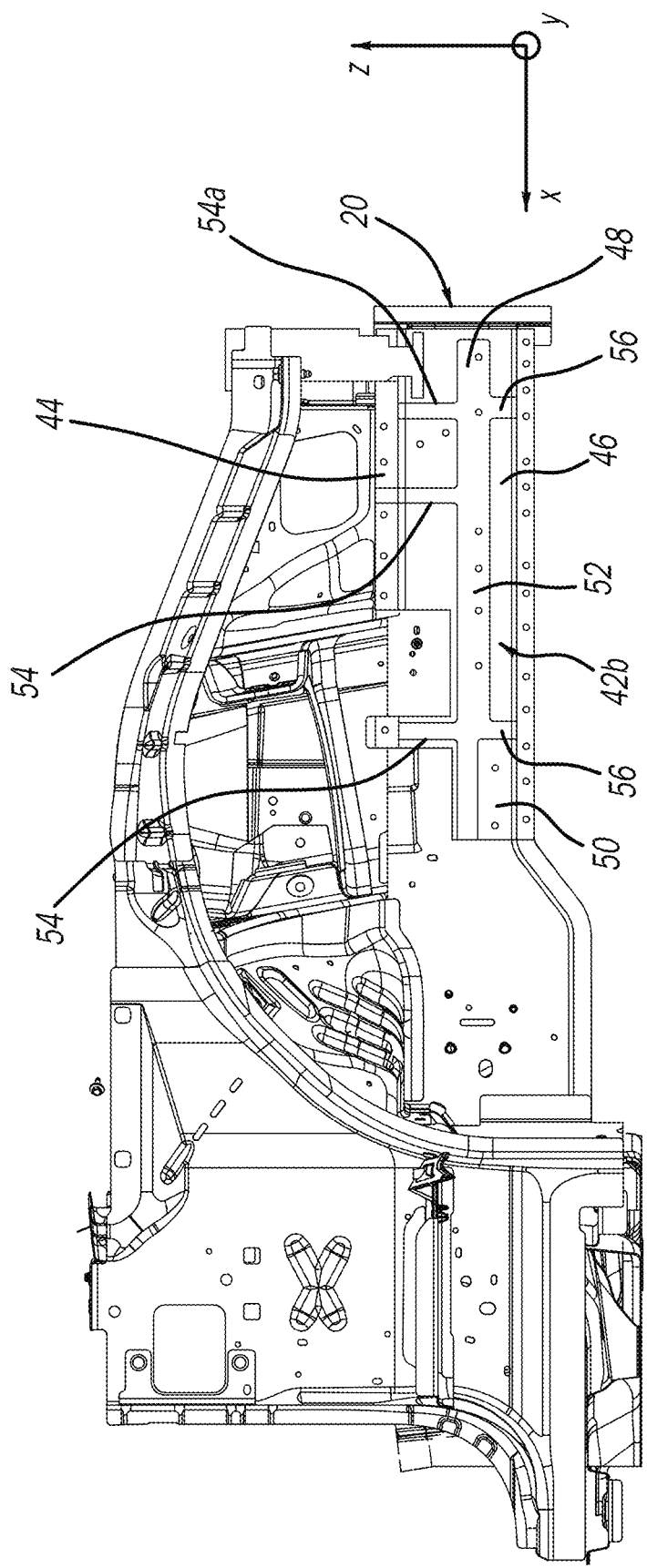
FIGS. 4 and 5 are side perspective views of a left rail and a right rail, respectively, of the portion of the frame illustrated in FIG. 2.
Figure 5:
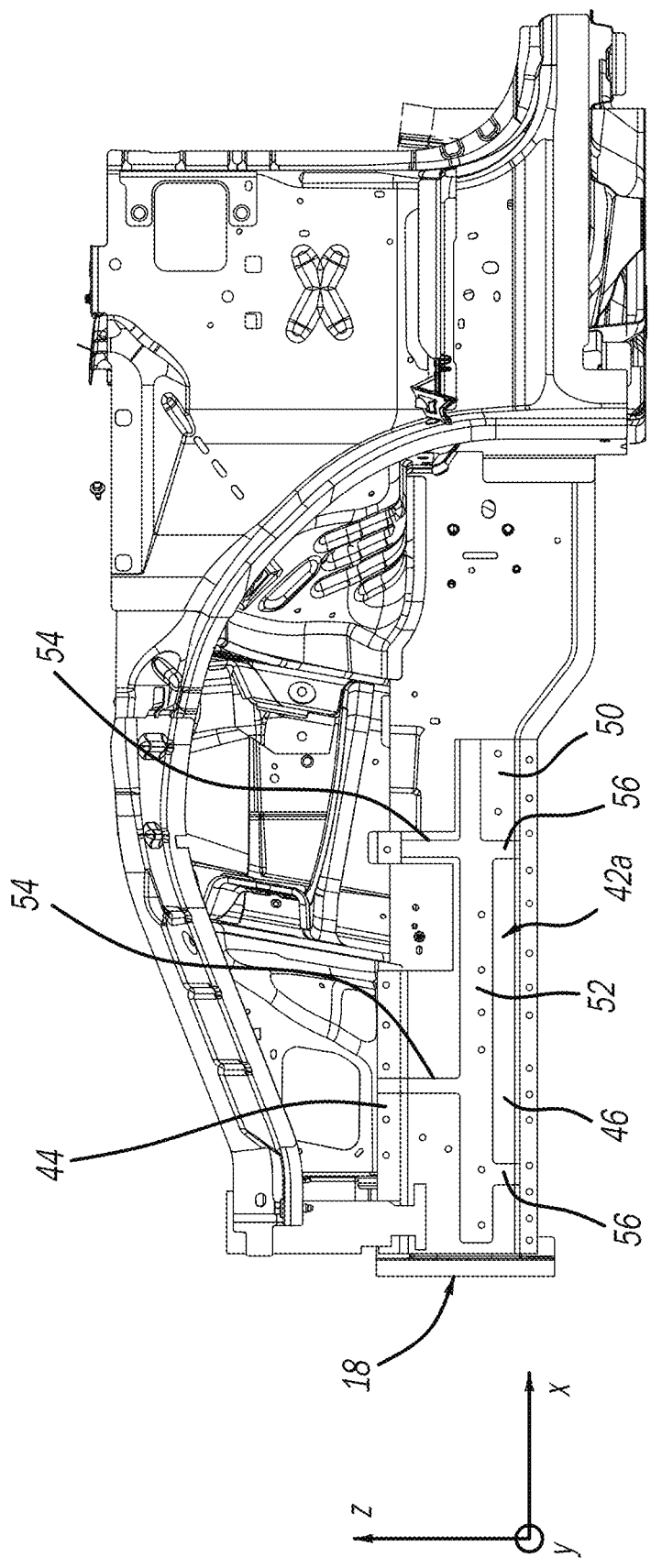

Referring to FIGS. 2, 4, and 5, it can be seen that each of the first rail 18 and second rail 20 include an upper surface 44 and an inner side surface 46 that faces electric drive module 24. The bead arrangements 42a and 42b are provided on the inner side surfaces 46 that face the electric drive module 24. By providing bead arrangements 42a and 42b on inner side surfaces 46 of the first and second rails 18 and 20, the first and second rails 18 and 20 are designed to deform in a more controlled manner not only when vehicle 10 is subjected to a direct frontal collision (see, e.g., FIG. 6), but also in a more controlled manner when subjected to angular impacts from the left (FIG. 7) and right (FIG. 8) sides of vehicle 10, respectively.

Referring to FIGS. 4 and 5, each bead pattern 42a and 42b includes a longitudinally extending bead 48 that extends in parallel with a longitudinal axis (x-axis) of vehicle 10. Longitudinally extending bead 48 may be in the form of a recess (as illustrated) that is recessed relative to an exterior surface 50 of the respective rail 18 or 20, or may be in the form of a protrusion (not shown) that extends outward from the exterior surface 50. In the illustrated embodiment, longitudinally extending bead 48 is in the form of a recess because various additional structural features (e.g., structural baffles, not shown) of the first and second rails 18 and 20 may be located within an interior of the rail 18 or 20 that are welded to the longitudinally extending bead 48 at weld spots 52. Regardless whether longitudinally extending bead 48 is in the form of a recess or a protrusion, it should be understood that longitudinally extending bead 48 increases the structural rigidity of the first and second rails 18, 20.

In addition, each bead pattern 42a and 42b includes a plurality of vertically upwards extending beads 54 and vertically downwardly extending beads 56 at various locations along a length longitudinally extending bead 48. Vertically upward and downward extending beads 54, 56, like longitudinally extending bead 48, also provide increased rigidity to first and second rails 18, 20. As can be seen in FIG. 4, the bead pattern 42b of second or left rail 20 that supports pump assembly 36 (see FIG. 2) has an increased number of vertically upwards extending beads 54. That is, bead pattern 42b includes an additional vertically upwards extending bead 54a. In this manner, the bead pattern 42b of the second or left rail 20 that supports the pump assembly 36 has been modified in comparison to that of the first or right rail 18 to deform to a lesser extent in comparison to the first or right rail 18 in a frontal (FIG. 6) or left-side angular impact (FIG. 7), which can assist in preventing contact between pump assembly 36 and high-voltage component 26 during a collision event.

Figure 6:
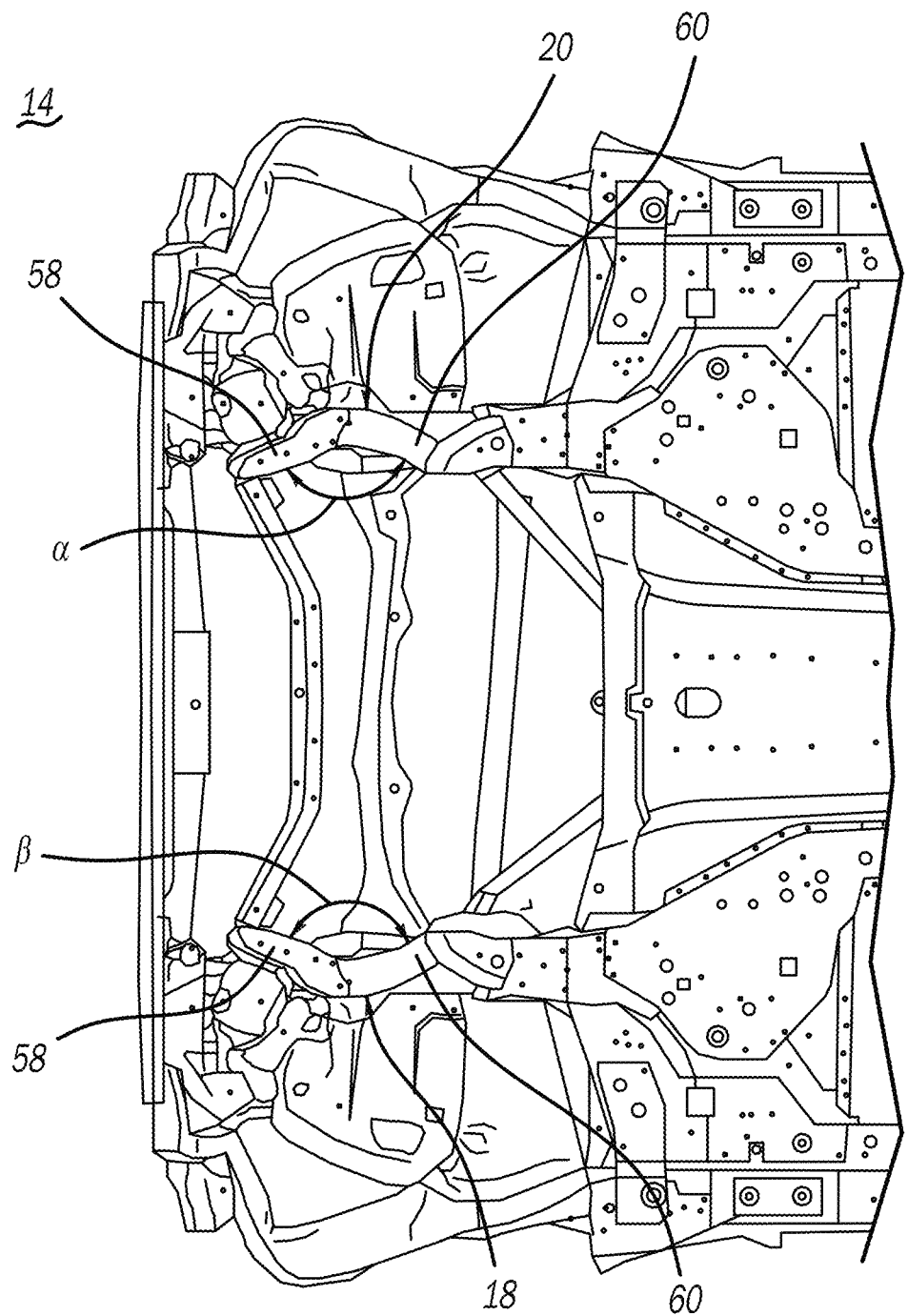
FIGS. 6-8 are underneath perspective views of the frame illustrated in FIG. 2 after having been subjected to a direct frontal impact, angular left side frontal impact, and angular right side frontal impact, respectively.
Figure 7:
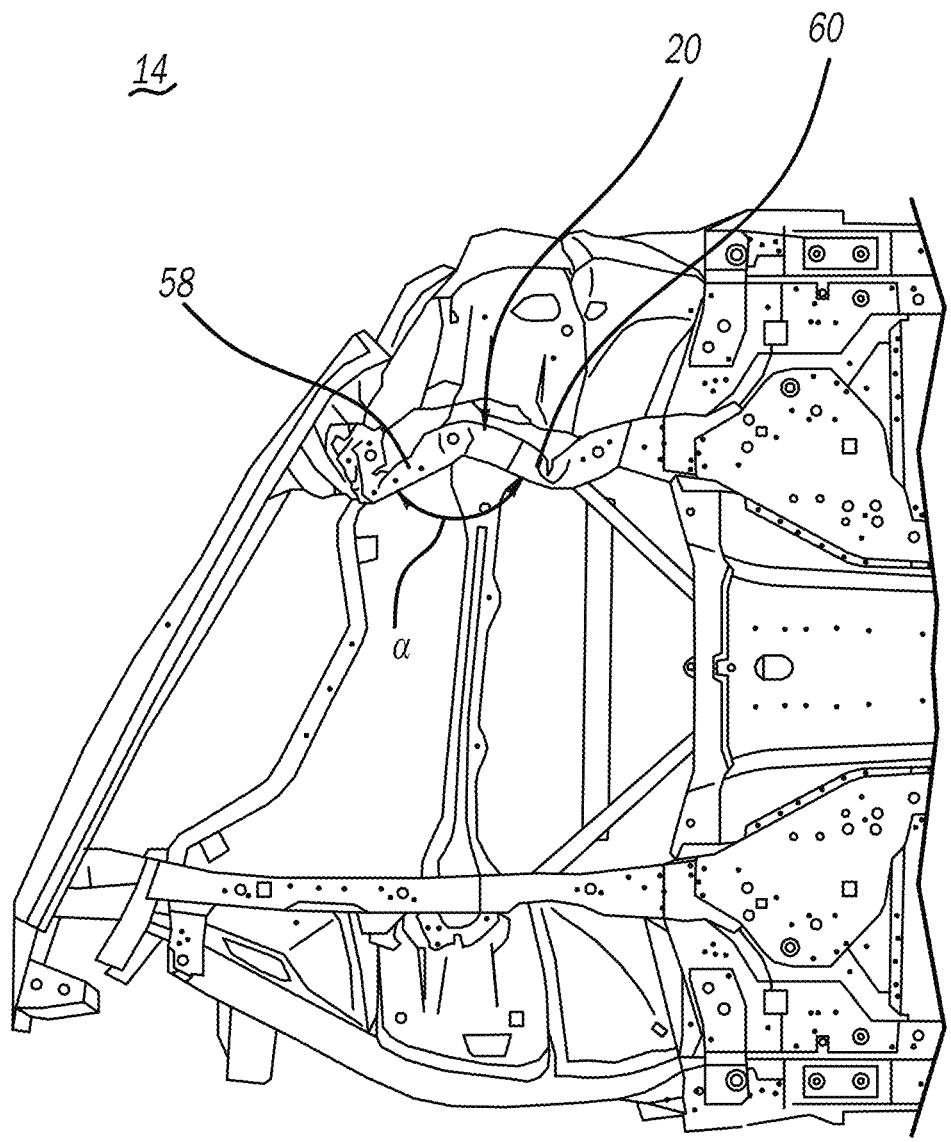
Figure 8:
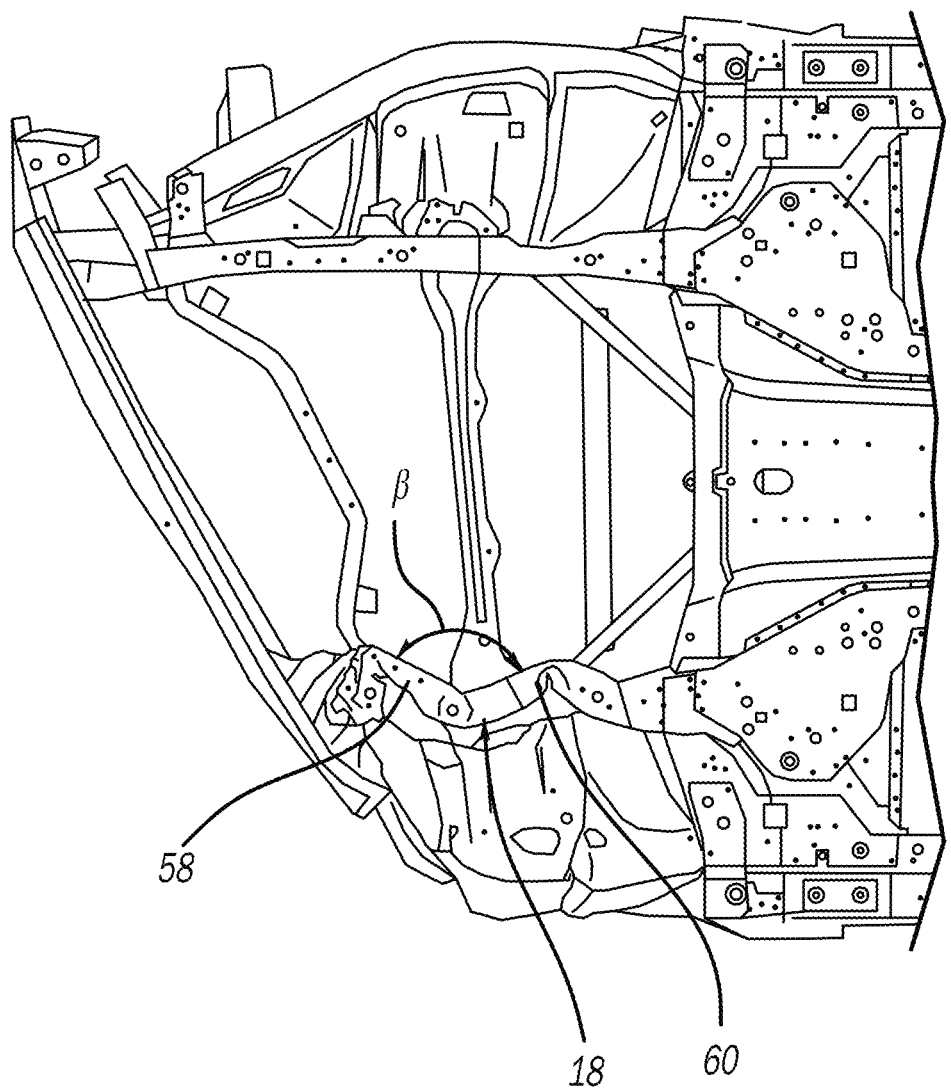

When viewing FIGS. 6-8, it should be understood that these views are bottom views of vehicle 10. The second or left rail 20 that includes the additional vertically upwards extending bead 54a, therefore, is at the top of each of these figures. FIG. 6 illustrates the result of a direct (i.e., flat) frontal impact between vehicle 10 and another vehicle or object at a velocity of 35 miles per hour (mph). FIG. 7 illustrates the result of an angular impact between vehicle 10 another vehicle or object at the second or left rail 20 at a velocity of 30 mph. FIG. 8 illustrates the result of an angular impact between vehicle 10 another vehicle or object at the first or right rail 18 at a velocity of 30 mph.

Referring to FIG. 6, it can be seen that second or left rail 20 has deformed to a lesser extent in comparison to the first or right rail 18. This is evident by the angle $\alpha$ between a distal section 58 and a proximate section 60 of left rail 20 being greater than the angle $\beta$ between the distal section 58 and the proximate section 60 of the right rail 18, which indicates that the left rail 20 has deformed to a lesser extent in comparison to the right rail 18. This is believed to be a result of the additional vertically upwards extending bead 54a provided at distal section 58. In any event, it can be seen that the bead pattern 42b having the additional vertically upwards extending bead 54 can assist in preventing, or at least minimize, contact between pump assembly 36 and high-voltage component 26. Similar results are illustrated in FIGS. 7 and 8.

The number of vertically upwards extending beads 54 and the number of vertically downwards extending beads 56 is variable and can be determined based on desired stiffness characteristics of each rail 18, 20. In addition, the distances D1, D2, and D3 (FIGS. 4 and 5) between various adjacent beads 54, 56 can also be variable and determined based on desired stiffness characteristics. As noted above, the important aspect to keep in mind is selecting a bead pattern 42a, 42b for the respective rail 18 or 20 to which pump assembly 36 is attached and attempt to prevent or at least reduce the chance of impact between pump assembly 36 and high-voltage component 26 during a frontal impact between vehicle 10 and either another vehicle or object.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:
1. A vehicle comprising:
a frame supporting an electric drive motor; and
a high-voltage component attached to a forward end and upper surface of the electric drive motor;
wherein the frame includes a first longitudinally extending rail and a second longitudinally extending rail,
one of the first longitudinally extending rail and the second longitudinally extending rail includes a component mounted thereto;

the first and second longitudinally extending rails each include a bead pattern that limits deformation of the respective rail during a frontal impact to the vehicle; and the bead pattern of the one of the first longitudinally extending rail and the second longitudinally extending that includes the component mounted thereto is different from the bead pattern of the other of the first longitudinally extending rail and the second longitudinally extending rail that does not have the component mounted thereto to limit an amount of deformation thereof during the frontal impact to the vehicle to minimize movement of the component in a direction toward the high-voltage component.

2. The vehicle according to claim 1, wherein each of the bead patterns includes a longitudinally extending bead, a plurality of vertically upwards extending beads connected to the longitudinally extending bead, and a plurality of vertically downwards extending beads connected to the longitudinally extending bead.

3. The vehicle according to claim 2, wherein the longitudinally extending bead, each of the vertically upwards extending beads, and each of the vertically downwards extending beads are in the form of a recess.

4. The vehicle according to claim 2, wherein the different bead pattern includes an additional vertically upwards extending bead connected to the longitudinally extending bead.

5. The vehicle according to claim 1, wherein the component is a pump assembly.

6. The vehicle according to claim 1, further comprising a protection shield attached to electric drive motor, and configured to shield the high-voltage component from the component during the frontal impact.

7. The vehicle according to claim 1, wherein the bead patterns are provided on a side surface of the first and second longitudinally extending rails that face the electric drive motor.

8. A vehicle comprising:
a frame including a first longitudinally extending rail and a second longitudinally extending rail;
an electric drive motor positioned between and supported by each of the first and second longitudinally extending rails;
a pump assembly attached to the first longitudinally rail at a location positioned forward of the electric drive motor; and a high-voltage component attached to a forward end and upper surface of the electric drive motor,
wherein the first longitudinally extending rail include a first bead pattern that limits deformation thereof during a frontal impact to the vehicle;
the second longitudinally extending rail include a second bead pattern that limits deformation thereof during a frontal impact to the vehicle; and
the first bead pattern is different from the second bead pattern to limit deformation of the first longitudinally extending rail during the frontal impact to a greater extent than the second bead pattern limits deformation of the second longitudinally extending rail during the frontal impact to minimize movement of the component in a direction toward the high-voltage component.

9. The vehicle according to claim 8, wherein each of the first and second bead patterns include a longitudinally extending bead, a plurality of vertically upwards extending beads connected to the longitudinally extending bead, and a plurality of vertically downwards extending beads connected to the longitudinally extending bead.

10. The vehicle according to claim 9, wherein the longitudinally extending bead, each of the vertically upwards extending beads, and each of the vertically downwards extending beads are in the form of a recess.

11. The vehicle according to claim 9, wherein the first bead pattern includes an additional vertically upwards extending bead connected to the longitudinally extending bead.

12. The vehicle according to claim 8, wherein the first and second bead patterns are provided on a side surface of the first and second longitudinally extending rails that face the electric drive motor.

13. The vehicle according to claim 8, further comprising a protection shield attached to electric drive motor, and configured to shield the high-voltage component from the component during the frontal impact.

14. The vehicle according to claim 13, wherein the protection shield is attached to a forward end of the electric drive motor at a position forward and spaced apart from the high-voltage component, and between the high-voltage component and the pump assembly, and
wherein the protection shield is configured to shield and deflect the pump assembly from contacting the high-voltage component when the pump assembly is forced in a direction toward the high-voltage component during the frontal impact.

* * * * *